(12) United States Patent
Wang et al.

(10) Patent No.: US 10,217,216 B2
(45) Date of Patent: Feb. 26, 2019

(54) KIND OF X-RAY CHEST IMAGE RIB SUPPRESSION METHOD BASED ON POISSON MODEL

(71) Applicant: SICHUAN UNIVERSITY, Chengdu, Sichuan (CN)

(72) Inventors: Junfeng Wang, Chengdu (CN); Lin Gao, Chengdu (CN); Fan Li, Chengdu (CN); Yulin Ji, Chengdu (CN); Zongan Liang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 42 days.

(21) Appl. No.: 15/598,656

(22) Filed: May 18, 2017

(65) Prior Publication Data

US 2017/0337686 A1 Nov. 23, 2017

(30) Foreign Application Priority Data

May 19, 2016 (CN) .......................... 2016 1 0335084

(51) Int. Cl.
*G06T 7/00* (2017.01)
*G06T 7/11* (2017.01)

(52) U.S. Cl.
CPC .............. *G06T 7/0012* (2013.01); *G06T 7/11* (2017.01); *G06T 2207/10116* (2013.01)

(58) Field of Classification Search
None
See application file for complete search history.

(56) References Cited

U.S. PATENT DOCUMENTS

| | | | | |
|---|---|---|---|---|
| 6,240,201 B1* | 5/2001 | Xu | ........................ | G06T 7/0012 382/128 |
| 2004/0252870 A1* | 12/2004 | Reeves | ................. | G06T 7/0012 382/128 |
| 2009/0214099 A1* | 8/2009 | Merlet | .................... | G06T 5/005 382/132 |
| 2013/0108135 A1* | 5/2013 | Huo | ....................... | G06T 7/0083 382/132 |
| 2014/0079309 A1* | 3/2014 | Huo | ....................... | G06T 7/0012 382/132 |
| 2015/0154765 A1* | 6/2015 | Huo | ....................... | G06T 11/005 382/132 |

* cited by examiner

*Primary Examiner* — Delomia L Gilliard
(74) *Attorney, Agent, or Firm* — Oliff PLC

(57) ABSTRACT

A X-ray chest image rib suppression method based on Poisson model. It conducts contourlet transformation on the image and utilizes transformation coefficient correlation between different scales to conduct texture enhancement on the image; it designs strip-type detection filter in accordance with the Hessian matrix eigenvalue to the image and detects the area where the rib locates in; it combines enhanced texture and rib area information, establishes and solves rib suppression Poisson model, realizing the rib suppression in the image. Anisotropy and contourlet transformation multi-direction feature is utilized, scale and coefficients direction information are combined and distinction degree between texture and noise improves, enhancing texture while restraining noise; it realizes ribs suppression through solving the Poisson model, which does not need to conduct accurate segmentation on the rib, prevents unnatural transition problem of edges resulted from explicit ribs suppression and effectively suppress the ribs, improving observation effect of X-ray chest image.

9 Claims, 2 Drawing Sheets

KIND OF X-RAY CHEST IMAGE RIB SUPPRESSION METHOD BASED ON POISSON MODEL

FIELD OF TECHNOLOGY

This invention involves the digital image processing technology especially involves a kind of X-ray chest image rib suppression method based on Poisson model.

BACKGROUND TECHNOLOGY

X-ray chest image is widely applied in the diagnosis of pulmonary disease such as pneumonia, phthisis, lung cancer and etc. Therein, the death toll of lung cancer is the highest one among the death tolls of all cancers. If the pulmonary disease can be detected in early phase, the therapeutic effect of the disease will be improved while the death rate of cancers will be reduced. Although the detection performance of X-ray chest image is not as good as that of CT, it has high economical efficiency and low radiation dosage. Thus, the X-ray chest image is still the major detection detection means at present.

X-ray chest imaging is the image of different intensity that is formed on the ray receiving surface based on the differences of density and thickness to different tissues in the lung which make the absorption degrees different during the X-ray penetration process. As the ray is projected to a two-dimensional surface, different tissues on the ray direction will be displayed on the image with overlap, which will result in the hard observation and recognition of the partial area of lesion. Ghost image is an inherent problem of X-ray chest image, which is also the main reason for the misdiagnosis making to many pulmonary diseases. The researches show that the misdiagnosis rate for the chest image diagnosis of the doctors reaches 30% and 82%-95% of missed diagnosis therein is resulted from the overlap or occlusion of the rib on the soft tissue of lung. The conventional method of gaining the image with the soft tissue of lung only is the dual energy difference technology, which uses the dedicated device to conduct the exposure perspective with two times of different energy on the people in detection and separates the rib and the soft tissue, which needs larger radiation dosage and is just confined to the institutions like hospital.

In recent years, the researchers utilize digital image processing technique to solve the ghost image problem of the chest image and put forward some solutions. For example, Giger et al. propose a kind of image difference technology which improves the detection rate of lung nodule (Medical Physics, vol. 17, pp. 861-865, 1990.). Keserci et al, design a kind of filter to conduct filtering on the image, which eliminates the influence of rib by restraining the oblong objects in the image and strengthens the circle objects to extrude the lung nodule in the image (Medical Image Analysis, vol. 6, pp. 431-447, 2002). Loog et al. put forward a kind of general filter framework based on regression to restrain the skeletal structure, which learns the filter by relying on the training image and obtains the soft tissue image through reconstruction of the testing images (Computer Vision Approaches to Medical Image Analysis, New York: Springer, 2006, vol. 4241, Lecture Notes in ComputerScience, pp. 166-177.). Suzuki et al. utilize artificial neural network to restrain the rib and strengthen the lung nodule (IEEE Trans. Med. Imaging, 2006, 25(4): 406-416.). Lee et al. Eliminate the rib through segmenting out the rib and adopting genetic algorithm to optimize a contrast model (Computers & Mathematics with Applications, 2012, 64(5): 1390-1399.). In general, these methods can be divided into the implicit and explicit rib suppression. Therein, the implicit methods conduct suppression after positioning the location of the rib and need to conduct accurate segmentation on the rib while the implicit methods need a large quantity of samples for training to build the regression model, which are not easy for the clinical application.

CONTENTS OF THE INVENTION

The technical problem that this invention aims to solve is to offer a kind of X-ray chest image rib suppression method based on Poisson model and to solve the overlap and occlusion problem of the rib for the soft tissue in the digital chest image which results in the difficult recognition, satisfying the demands of the image reader or the computers on the detection and recognition of the lesion in digital chest image.

To solve the technical problems mentioned above, the technical solution adopted by this inventions is:

A kind of X-ray chest image rib suppression method based on Poisson model, which includes the steps as follows:

Step 1: Read the original Chest Image I and conduct Contourlet transformation on the Chest Image I;

Step 2: Stretch the contrast of the low frequency coefficient after Contourlet transformation;

Step 3: Conduct gain transformation on the high frequency coefficient after Contourlet transformation and reconstitute the Chest Image E based on the transformed coefficients for texture enhancement;

Step 4; Conduct Gaussian filtering on the original Chest Image I at multiple scales, calculate the Hessian matrix of the filtered image and its eigenvalue, and establish the strip-type detection filter. Use the detection filter to detect and locate the rib to obtain the binary mask image;

Step 5: In accordance with the Chest Image E gotten from Step 3 and the binary mask image of the rib area gotten from Step 4, obtain the output Image I*, which means to conduct convolution operation on the Check Image E by adopting laplacian template, gaining the divergence value $$DIV(E) = \frac{\partial E_x}{\partial x} + \frac{\partial E_y}{\partial y}$$

of the gradient field for that image and establishing the Poisson equation $\Delta G = DIV(E)$ s.t. $G|_{\partial\Omega} = I|_{\partial\Omega}$. Therein, is the gray value of pixel within the rib area, I is the original chest image and $\partial\Omega$ is the rib area boundary, i.e. the rib area boundary in the binary mask image of Step 4.

In accordance with the solution mentioned above, in the mentioned Step 1, respectively conduct certain amount of translation in the directions of row and column to the original Chest Image I to overcome the Pseudo-Gibbs problem before conducting Contourlet transformation.

In accordance with the program mentioned above, the mentioned formula adopted to stretch the contrast is $\hat{C}_0(m,n) = (h1-h2)(k(C_0(m,n)-M)+M)$. Therein, $\hat{C}_0(m,n)$ is the coefficient after adjustment, h1, h2 are the high-frequency gain and low-frequency gain respectively, M refers to the mean value of low-frequency coefficients and $k \in [0,1]$ is the contrast adjustment factor.

In accordance with the program mentioned above, the mentioned gain transformation formula is $$\hat{C}_{j,k}(m, n) =$$
$$\begin{cases} (W_k(m, n)/T_g)^p C_{j,k}(m, n) & |C_{j,k}(m, n)| \geq T_g \\ (1 - ((1 - W_k(m, n))/(1 - T_g))^p) C_{j,k}(m, n) & |C_{j,k}(m, n)| < T_g \end{cases}$$

Therein, $\hat{C}_{j,k}(m,n)$ is the transform domain coefficient after enhancement, $p \in (1,\infty)$ is the gain factor, $T_g$ is the gain threshold and $W_k$ is the gain coefficient; The mentioned gain coefficient $W_k$ is expressed as $$W_k(m, n) = \sum_{j=1}^{j} |C'_{j,k}(m, n)| / \max\left\{\sum_{j=1}^{j} |C'_{j,k}(m, n)|\right\}$$

in detail. Therein, $C_{j,k}'$ is the matrix gotten through interpolation from the transform domain coefficient matrix $C_{j,k}$ in Scale J and Direction k, M, n are the rows/columns index and J is the maximum scale level, for which $0 < j \leq J$.

In accordance with the program mentioned above, number of the mentioned scales in Step 4 is 3.

In accordance with the program mentioned above, the mentioned strip-type detection filter is $F = e^{(\lambda_2/\lambda_1)^2}(1 - e^{(\lambda_1 + \lambda_2)^2})$. In accordance with the output result of Filter F, adopt Otsu algorithm to conduct self-adaptive threshold segmentation to gain the binary mask image of the rib area.

Being compared with the current technology, the beneficial effects of this invention are that: It adopts Contourlet transformation and combines the scale and direction information of the coefficient to improve the distinction degree between the texture and the noise, enhancing the texture while restraining the noise. It restrains the rib through solving the Poisson model and conducts restraining in the rib area gotten from the detection. This invention can be realized in accordance with the approximate area where the rib locates instead of needing accurate segmentation of the ribs, which reduces the complexity of processing. At the same time, it solves the unnatural transition problem formed due to the direct reduction of rib gray. The method of this invention only needs a little empirical parameters and it does not need manual intervention during the whole processing process, which is convenient and practical. It is easy to be integrated to the professional digital chest image reading equipment or the image processing system.

SPECIFICATION OF THE ATTACHED FIGURES

SPECIFIC IMPLEMENTATION METHOD

Figure 1:
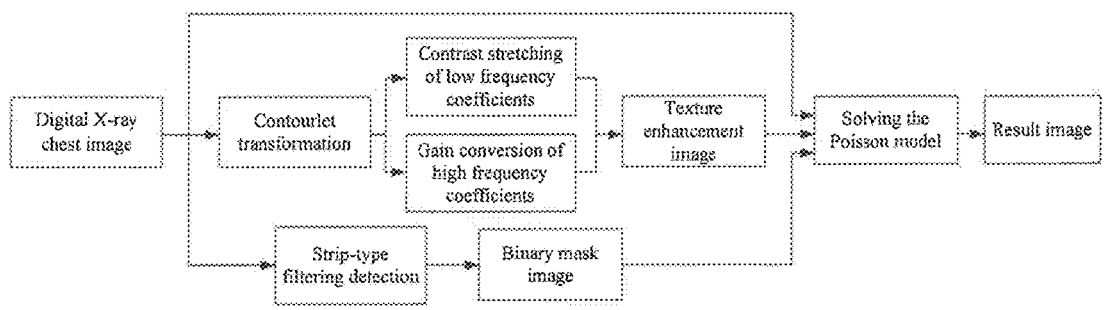
FIG. 1 shows the realization process schematic diagram for the method of this invention.

Further specific specification is given as follows by combining the attached figures and the implementation case in detail. As shown in FIG. 1, a kind of X-ray chest image rib suppression method based on Poisson model includes the steps as follows:

Step 1: Read the original Chest Image I and conduct Contourlet transformation on the Chest Image I. In the Contourlet transformation, the signal will be processed by up-sampling and down-sampling, which will make the coefficient change obviously. Such situation is called as the Pseudo-Gibbs phenomena. That means the Contourlet transformation does not have translation invariance and larger amplitude will occur near the edge points of the reconstructed image after enhancement. To overcome the Pseudo-Gibbs phenomena, conduct certain amount of translation in the directions of row and column to the image before Contourlet transformation.

Step 2: Stretch the contrast of the low frequency coefficient in accordance with Formula (1) after Contourlet transformation:

$$\hat{C}_0(m,n) = (h1 - h2)(k(C_0(m,n) - M) + M) \quad (1)$$

Therein, $\hat{C}_0(m,n)$ is the coefficient after adjustment, h1, h2 are the high-frequency gain and low-frequency gain respectively, M refers to the mean of low-frequency gain and $k \in [0,1]$ is the contrast adjustment factor. Enhance the partial contrast on the basis of keeping the original appearance of the image.

Step 3: Conduct gain transformation on the high frequency coefficient in accordance with Formula (2) after Contourlet transformation and reconstitute the Chest Image E for texture enhancement;

$$\hat{C}_{j,k}(m, n) = \quad (2)$$
$$\begin{cases} (W_k(m, n)/T_g)^p C_{j,k}(m, n) & |C_{j,k}(m, n)| \geq T_g \\ (1 - ((1 - W_k(m, n))/(1 - T_g))^p) C_{j,k}(m, n) & |C_{j,k}(m, n)| < T_g \end{cases}$$

Therein, $\hat{C}_{j,k}(m,n)$ is the transform domain coefficient after enhancement, $p \in (1,\infty)$ is the gain factor, $T_g$ is the gain threshold and $W_k$ is the gain coefficient. Comprehensively consider about the correlation between the signal and the noise within the scale to calculate the gain coefficient. Transform the coefficient module value on every decomposition direction to the finest scale through quadratic interpolation and then conduct the summation and normalization.

$$W_k(m, n) = \sum_{j=1}^{j} |C'_{j,k}(m, n)| / \max\left\{\sum_{j=1}^{j} |C'_{j,k}(m, n)|\right\} \quad (3)$$

Therein, $C_{j,k}'$ is the matrix gotten through interpolation from the transform domain coefficient matrix $C_{j,k}$ in Scale J and Direction k. M, n are the rows/columns index and J is the maximum scale level. As only the high frequency coefficient is considered here, thus $0 < j \leq J$. $W_k$ is the coefficient matrix after normalization, whose element value range is [0,1].

Step 4: Read the original chest image and conduct Gaussian filtering on the image at multiple scales to obtain $I_s$. The larger the scale number is, the more accurate the algorithm will be. However, the computation will also increase. With overall consideration, normally it is better to select 3 scales. Size of the scale is determined based on the standard deviation of Gaussian kernel, which can be evaluated in accordance with the proportion of the rib in the image. In Image $I_s$ with scale as s, calculate the Hessian matrix $H_i$ of all pixel points. Calculate the eigenvalue $\lambda_1$, $\lambda_2$ of $H_i$ and construct the strip-type detection filter F:

$$F = e^{(\lambda_2/\lambda_1)^2}(1 - e^{(\lambda_1 + \lambda_2)^2}) \quad (4)$$

Use the filter to strengthen the ribs at multiple scales and take the maximum value at multiple scales as the output result. Use Otsu algorithm to conduct self-adaptive threshold segmentation on the output result, obtaining the binary mask image of the rib area.

Step 5: in accordance with the gradient information in the Texture Enhancement Image E and the boundary information in the rib area, obtain the finally output Image I* through solving the Poisson's equation. Conduct convolution operation on the Texture Enhancement Image E gotten in Step 3 with laplacian template to obtain the divergence value $$DIV(E) = \frac{\partial E_x}{\partial x} + \frac{\partial E_y}{\partial y}$$

of the gradient field for that image and establish the Poisson equation:

$$\Delta G = DIV(E) \text{ s.t. } G|_{\partial\Omega} = I|_{\partial\Omega} \quad (5)$$

Therein, G is the gray value of pixel within the rib area of output Image I*, I is the original chest image and ∂Ω is the rib area boundary, i.e. the rib area boundary in the binary mask image of Step 4.

Figure 2:
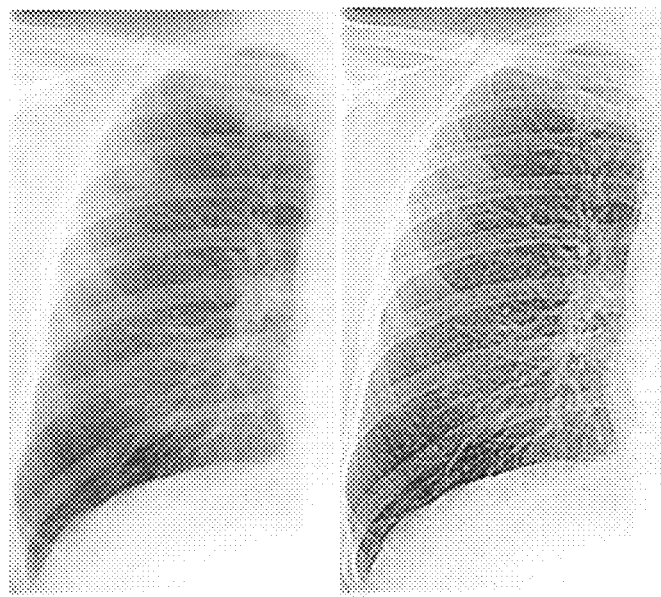
FIG. 2 shows the comparison diagram for the original image and the texture enhanced image of this invention.
Figure 3:
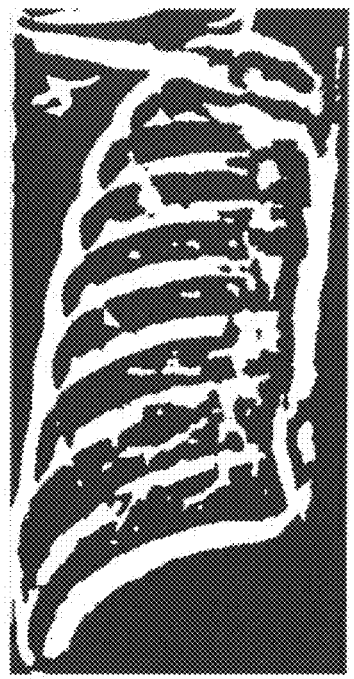
FIG. 3 shows the detection effect diagram of the rib area in this invention.
Figure 4:
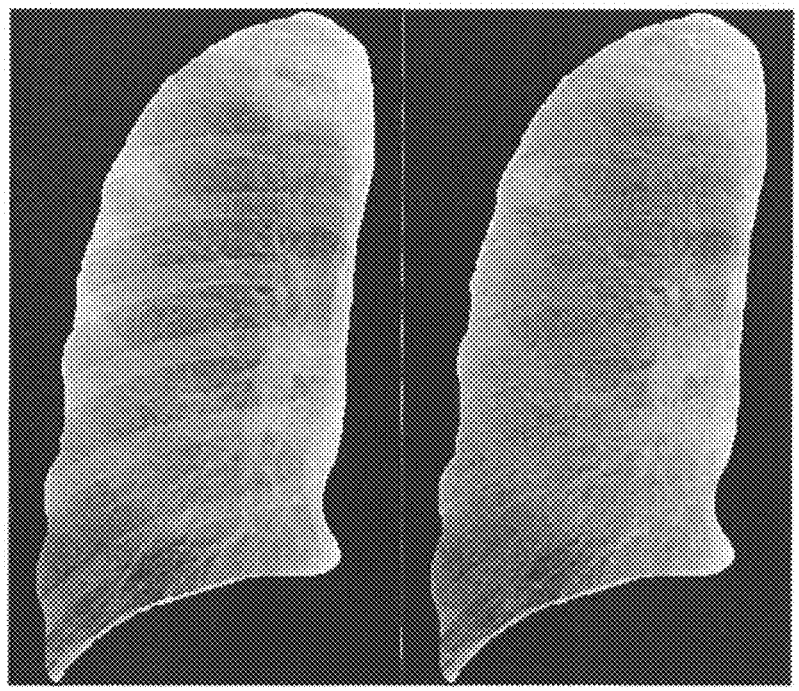
FIG. 4 shows the comparison diagram for the original image and the rib suppression figure in this invention.

FIG. 2 shows the comparison diagram between the original image and the texture enhancement image. In the figure, the original image shows a local image of lung and the enhanced image highlights the detail feature of the edge. And the image contrast is also improved. FIG. 3 shows the binary mask image obtained through rib detection, in which the mask includes the approximate area where the rib locates in. FIG. 4 shows the comparison diagram in the lung field between the original image and the rib suppression image, from which the texture of the overlap area is clear and visible after rib suppression.

The invention claimed is:

1. An X-ray chest image rib suppression method based on a Poisson model, the method comprising the following steps:
   Step 1: read an original Chest Image I and conduct contourlet transformation on the Chest Image I;
   Step 2: perform contrast stretching of a first frequency coefficient after the contourlet transformation;
   Step 3: conduct gain transformation on a second frequency coefficient after the contourlet transformation and reconstitute a Chest Image E based on the transformed first and second frequency coefficients for texture enhancement, the first frequency coefficient being lower than the second frequency coefficient;
   Step 4: conduct Gaussian filtering on the original Chest Image I at multiple scales, calculate a Hessian matrix of the filtered Chest Image I and of an eigenvalue of the filtered Chest Image I, and establish a strip-type detection filter, the strip-type detection filter detecting and locating a rib to obtain a binary mask image of a rib area of the rib; and
   Step 5: based on the Chest Image E generated in the Step 3 and the binary mask image of the rib area generated in the Step 4, obtain an output Image I* by conducting a convolution operation on the Chest Image E by adopting a Laplacian template, gaining a divergence value $$DIV(E) = \frac{\partial E_x}{\partial x} + \frac{\partial E_y}{\partial y}$$

of a gradient field for the Chest Image E and establishing a Poisson equation $\Delta G = DIV(E)$ s.t. $G|_{\partial\Omega} = I|_{\partial\Omega}$; wherein, G is a gray value of pixels within the rib area, I is the original Chest Image I and ∂Ω is a boundary of the rib area in the binary mask image of the Step 4.

2. The X-ray chest image rib suppression method according to claim 1, wherein
in the Step 1, a first amount of translation in a row direction and a column direction to the original Chest Image I is conducted before conducting the contourlet transformation.

3. The X-ray chest image rib suppression method according to claim 1, wherein
a contrast stretching formula for the Step 2 is
$\hat{C}_0(m,n) = (h1-h2)(k(C_0(m,n)-M)+M)$; wherein, $\hat{C}_0(m,n)$ is a coefficient after adjustment, h1, h2 are a first frequency gain and a second frequency gain respectively, the first frequency gain being higher than the second frequency gain, M is a mean of the first frequency coefficient, and k∈[0,1] is a contrast adjustment factor.

4. The X-ray chest image rib suppression method according to claim 3, wherein
a gain transformation formula for the Step 3 is $$\hat{C}_{j,k}(m,n) = \begin{cases} (W_k(m,n)/T_g)^p C_{j,k}(m,n) & |C_{j,k}(m,n)| \geq T_g \\ (1-((1-W_k(m,n))/(1-T_g))^p)C_{j,k}(m,n) & |C_{j,k}(m,n)| < T_g \end{cases}$$

wherein, $\hat{C}_{j,k}(m,n)$ is a transform domain coefficient after enhancement, p∈(1,∞) is a gain factor, $T_g$ is a gain threshold and $W_k$ is a gain coefficient, the gain coefficient $W_k$ being expressed as $$W_k(m,n) = \sum_{j=1}^{j} |C'_{j,k}(m,n)| / \max\left\{\sum_{j=1}^{j} |C'_{j,k}(m,n)|\right\}$$

wherein, $C_{j,k}'$ is a matrix obtained through interpolation from the transform domain coefficient matrix $C_{j,k}$ in scale J and direction k, M, n are rows/columns indexes, and the scale J is a maximum scale level, for which 0<j≤J.

5. The X-ray chest image rib suppression method according to claim 1, wherein
the number of the scales in the Step 4 is 3.

6. The X-ray chest image rib suppression method according to claim 1, wherein
the strip-type detection filter is $F = e^{(\lambda_2/\lambda_1)^2}(1-e^{(\lambda_1+\lambda_1)^2})$; wherein in the output result of Filter F, an Otsu algorithm is adopted to conduct self-adaptive threshold segmentation to obtain the binary mask image of the rib area.

7. The X-ray chest image rib suppression method according to claim 2, wherein
a contrast stretching formula for the Step 2 is
$\hat{C}_0(m,n) = (h1-h2)(k(C_0(m,n)-M)+M)$, wherein, $\hat{C}_0(m,n)$ is a coefficient after adjustment, h1, h2 are a first frequency gain and a second frequency gain respectively, the first frequency gain being higher than the second frequency gain, M is a mean of the first frequency coefficient, and k∈[0,1] is a contrast adjustment factor.

8. The X-ray chest image rib suppression method according to claim 5, wherein the strip-type detection filter is $F=e^{(\lambda_2/\lambda_1)^2}(1-e^{(\lambda_1+\lambda_2)^2})$; wherein in the output result of Filter F, an Otsu algorithm is adopted to conduct self-adaptive threshold segmentation to obtain the binary mask image of the rib area.

9. The X-ray chest image rib suppression method according to claim 7, wherein a gain transformation formula for the Step 3 is $$\hat{C}_{j,k}(m,n) = \begin{cases} (W_k(m,n)/T_g)^p C_{j,k}(m,n) & |C_{j,k}(m,n)| \geq T_g \\ (1-((1-W_k(m,n))/(1-T_g))^p)C_{j,k}(m,n) & |C_{j,k}(m,n)| < T_g \end{cases};$$

wherein, $\hat{C}_{j,k}(m,n)$ is a transform domain coefficient after enhancement, $p \in (1,\infty)$ is a gain factor, $T_g$ is a gain threshold and $W_k$ is a gain coefficient, the gain coefficient $W_k$ being expressed as $$W_k(m,n) = \sum_{j=1}^{j} |C'_{j,k}(m,n)| / \max\left\{\sum_{j=1}^{j} |C'_{j,k}(m,n)|\right\}$$

wherein, $C_{j,k}'$ is a matrix obtained through interpolation from the transform domain coefficient matrix $C_{j,k}$ in scale J and direction k, M, n are rows/columns indexes, and the scale J is the maximum scale level, for which 0<j≤J.

* * * * *